(12) United States Patent
Amalou

(10) Patent No.: US 10,599,233 B1
(45) Date of Patent: Mar. 24, 2020

(54) COMPUTER MOUSE DEVICE WITH MODIFIED DESIGN AND FUNCTIONALITY

(71) Applicant: Alfaisal University, Riyadh (SA)

(72) Inventor: Farid Amalou, Riyadh (SA)

(73) Assignee: Alfaisal University, Makkah (SA)

( * ) Notice: Subject to any disclaimer, the term of this patent is extended or adjusted under 35 U.S.C. 154(b) by 0 days.

(21) Appl. No.: 16/290,647

(22) Filed: Mar. 1, 2019

(51) Int. Cl.
| | |
|---|---|
| *G06F 3/03* | (2006.01) |
| *G06F 3/0354* | (2013.01) |
| *G06F 3/0346* | (2013.01) |
| *G06F 3/0481* | (2013.01) |
| *A63F 13/24* | (2014.01) |
| *A63F 13/211* | (2014.01) |
| *A63F 13/22* | (2014.01) |
| *G06F 3/01* | (2006.01) |
| *G06F 3/0362* | (2013.01) |

(52) U.S. Cl.
CPC ........ *G06F 3/03543* (2013.01); *A63F 13/211* (2014.09); *A63F 13/24* (2014.09); *G06F 3/0304* (2013.01); *G06F 3/0346* (2013.01); *G06F 3/04815* (2013.01); *A63F 13/22* (2014.09); *A63F 2300/105* (2013.01); *A63F 2300/1018* (2013.01); *A63F 2300/1043* (2013.01); *G06F 3/017* (2013.01); *G06F 3/0362* (2013.01); *G06F 2203/0333* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 4,791,408 | A * | 12/1988 | Heusinkveld | B41J 5/10 400/479 |
| 5,841,425 | A * | 11/1998 | Zenz, Sr. | G06F 3/0213 345/163 |
| 7,006,075 | B1 * | 2/2006 | Olson | G06F 3/03543 345/156 |
| 7,277,083 | B2 * | 10/2007 | Duncan | A63F 13/06 345/156 |
| 2006/0274044 | A1 * | 12/2006 | Gikandi | G06F 3/03543 345/163 |
| 2011/0050566 | A1 * | 3/2011 | Sawai | G06F 3/033 345/157 |

* cited by examiner

*Primary Examiner* — Joseph R Haley
(74) *Attorney, Agent, or Firm* — Geeta Kadambi; Riddhi IP LLC

(57) ABSTRACT

The computer mouse device with modified design and functionalities have several touch centres including but not limited to, four finger click buttons, two function buttons and a scroll wheel button, is described. The computer mouse device provides comfort for the hand in prolonged, normal or extensive usage, an enhanced accuracy for pixel accurate applications, and a more immersive and realistic interaction with 3D, virtual or augmented reality environments operating drones, medical instruments, machines, robots or drones, as well as 3D applications including but not limited to 3D CAD applications, video games, virtual or augmented reality.

8 Claims, 8 Drawing Sheets

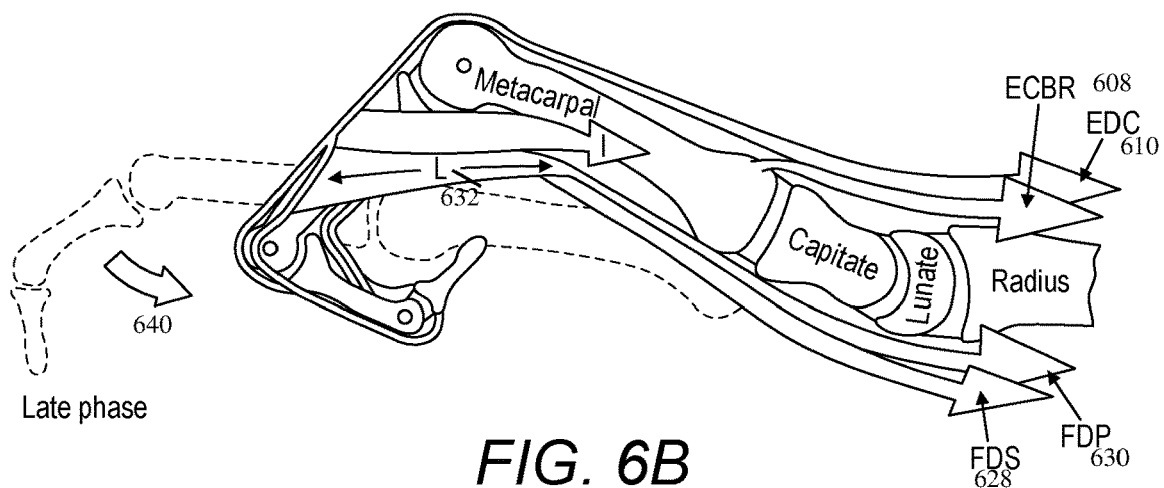
FIG. 6B
(Prior Art)
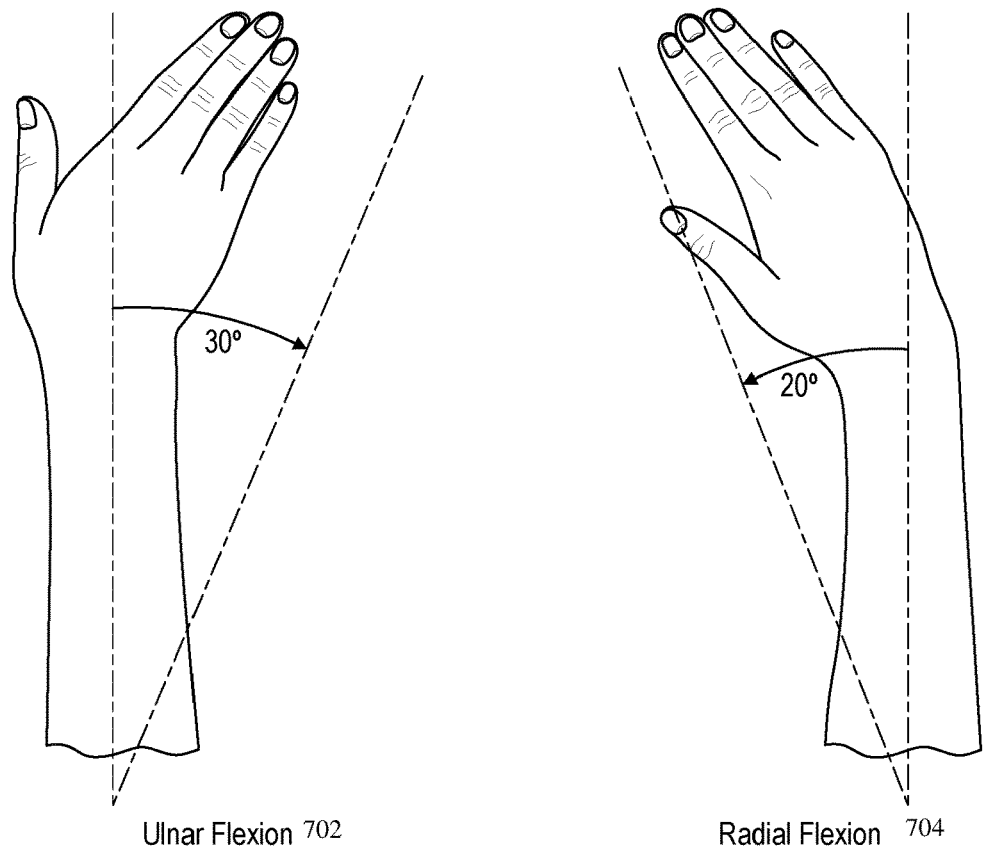
Ulnar Flexion 702        Radial Flexion 704
FIG. 7A        FIG. 7B
(Prior Art)        (Prior Art)

COMPUTER MOUSE DEVICE WITH MODIFIED DESIGN AND FUNCTIONALITY

FIELD OF TECHNOLOGY

This computer mouse device relates to a novel ergonomic computer mouse device having an enhanced and modified contoured design and having specific functionality.

BACKGROUND

The current professional environment makes people sit in front of computers and use computer mice for prolonged periods of time. This often results in persistent wrist, hand and shoulder injuries that may in some instances last a life time if not treated with surgery. There are three main types of computer mice on the market based on the grip style. These are the palm grip, claw grip and the finger-tip grip, with each one having its own advantages and disadvantages with regard to comfort, user experience and accuracy depending on the applications. Current standard computer mice, which usually fall within one of the three types described above, present several limitations in terms of functionalities and user experience. More sophisticated options can be costly and less intuitive, like the ones offered by 3dconnexion (3dconnexion, 2019) for "Immersive Navigation of 3D Designs and Environments". Even then, these costlier options can only be operated effectively when combined with standard computer mice. There is a need for a better design to overcome the short comings of current existing designs.

SUMMARY

The instant invention discloses an ergonomic computer mouse device with a modified design having several touch centres including but not limited to what is described in the following sections. The instant description is addressing an ever growing need for a more ergonomic design for computer mice, for prolonged, accurate, and intensive usage, with added functionalities in order to keep up with the recent developments in computer interaction and user experience, including but not limited to more immersive video gaming as well as 3D interaction with virtual and/or augmented reality environments.

In one embodiment, easy-to-reach finger click buttons, two function buttons and a scroll wheel button are described. In one embodiment, the design of the computer mouse device enables a clutch grip rather than a claw grip, palm grip and or fingertip grip. In another embodiment, the specific contour of the computer mouse device enables a person to rest their hand in a natural position. The clutch grip position in one embodiment can be described as being the closest to the rest position of the hand and palm that is half closed with an angle of 35 degrees between the axis of the forearm and the palm.

In one unique embodiment, the different combinations of mouse clicks, function buttons as well as surface gestures are implemented in the ergonomic computer mouse device. In another embodiment, combinations are designed by using only one standard optical sensor, similar to the ones used in all standard optical computer mice. In another embodiment, gestures are combined with the instant ergonomic computer mouse device that includes a gyro and an optical sensor, in which case the mouse could be lifted off the surface for space and 3D interaction, or even a design with two optical sensors which would offer an additional degree of freedom and an enhanced level of precision.

In one embodiment, a computer program is implemented through the imbedded computer mouse drivers in order to achieve specific tasks or accomplish a certain level of interaction depending on the application or platform being used. Each finger click has a specific function in one embodiment. The index finger touch sensor click button is capable of simple left click, usual double click and drag and drop function. Each finger click and other touch sensors have more than one function in embodiment after using the computer mouse device.

In one embodiment, the combination of finger clicks with the standard functionalities of computer mouse device gestures reproduces complex functionalities such as those achieved with a track-pad, a 3D mouse or a space navigation remote control for drones, airplanes etc. Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which:

FIGS. 6A and 6B (Prior Art) show the strain that is put on various muscles in the wrist and forearms while using the computer mouse.

FIGS. 7A and 7B (Prior Art) shows the hand movements during computer mouse usage.

Other features of the instant embodiments will be apparent from the accompanying drawings and from the detailed description that follows.

DETAILED DESCRIPTION

The instant disclosure describes a novel computer mouse having an enhanced and modified contoured design, with easy-to-reach keys for each finger for a smooth and more accurate normal use, as well as added functionalities for a more immersive 3D interaction in virtual and/or augmented reality environments. The computer mouse described here also enables, but are not limited to, precise control of medical or surgical instruments, help users suffering from wrist injuries recover while still being able to use their computers, and also more accurately remotely control complex systems like robots or drones for various applications. The contour of the mouse is not similar to oval, round or oblong shape as conventional mice but is unique and contoured to accommodate a normal clutch position of the hand and palm when facing downwards.

The current disclosure shows an ergonomic design for a computer mouse which offers both comfort for prolonged usage, through a more natural posture for the hand and wrist, and also enhanced functionalities in terms of user experience with the possibility to use all fingers in a more efficient and intuitive way. This gives the user the possibility to not only take advantage of the widely used finger gestures for computer interaction and navigation, normally exclusively reserved for trackpads, but also offers enhanced capabilities in terms of space and 3D interaction, virtual or augmented reality, video gaming, computer CAD design and many other applications which require accurate computer pointing devices. These include but are not limited to information graphics, image and video editing, medical image processing and analysis.

Figure 1:
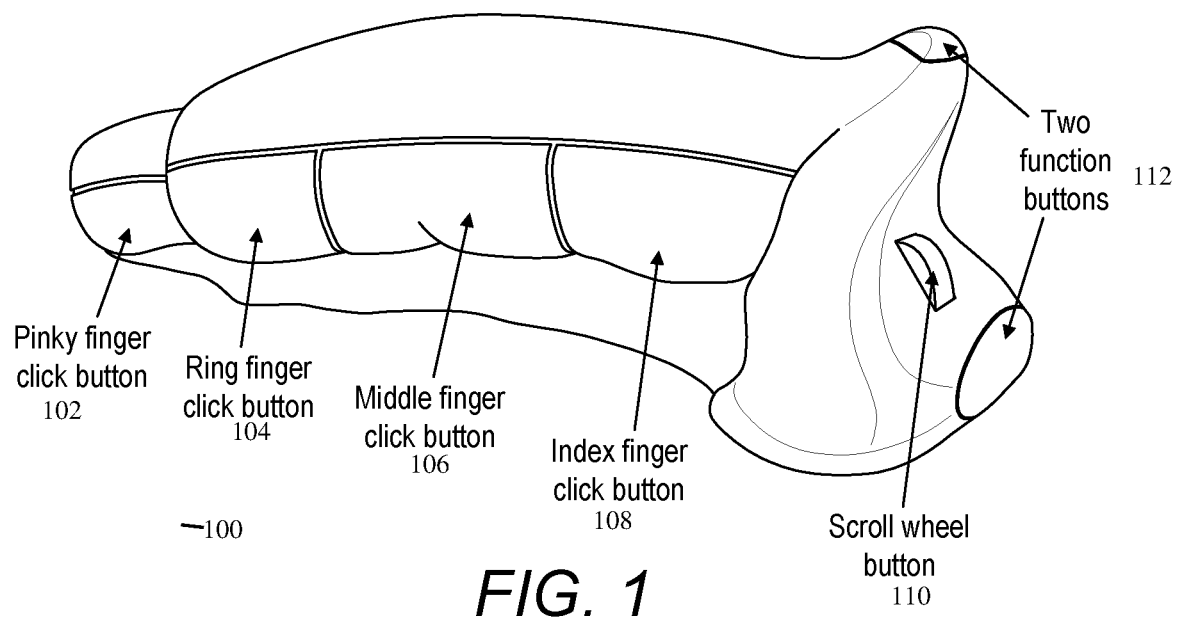
FIG. 1 shows a perspective front view of the instant computer mouse device showing all the key elements of the design.
Figure 2:
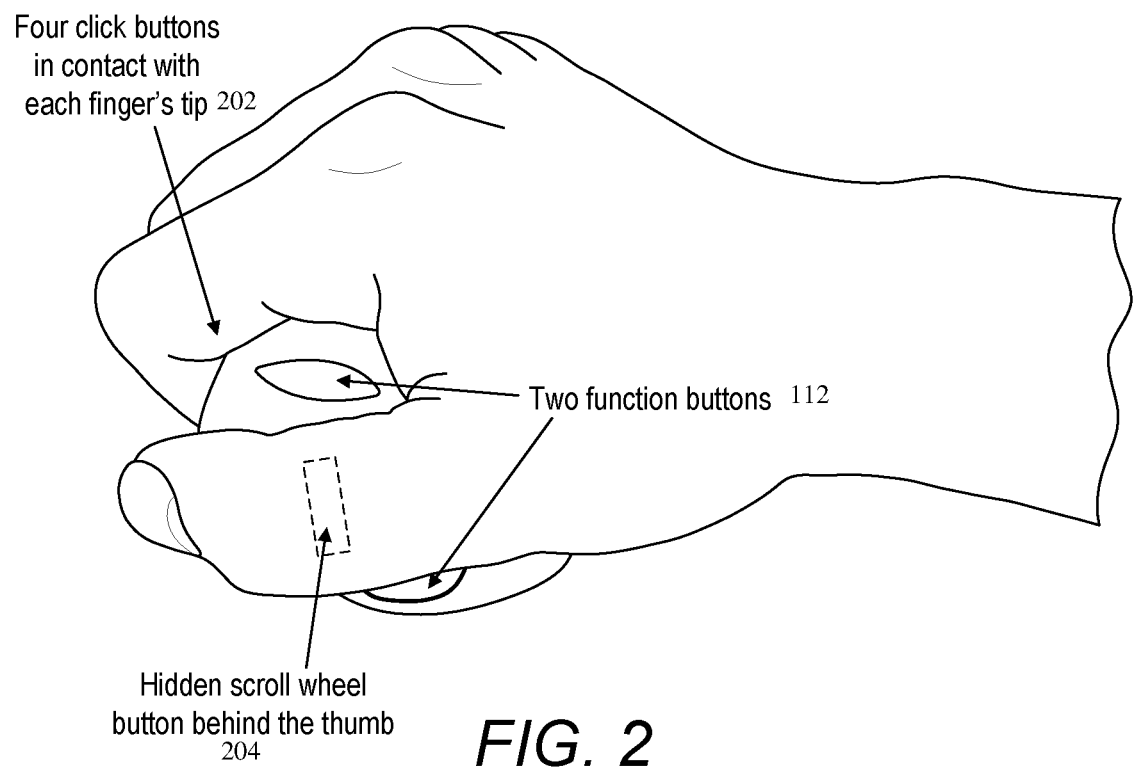
FIG. 2 shows a top view of the clutch grip that the embodiment of FIG. 1 design allows the user to perform.

FIG. 1 shows a specific contoured mouse 100 with several touch sensors such as a pinky finger click button 102, a ring finger click button 104, a middle finger click button 106, an index finger click button 108, a scroll wheel 110 and two function buttons 112. The mouse design has an elongated contoured back surface that accommodates the resting palm comfortably, as well as a protruding contoured part, as an extension of the back surface towards the front of the mouse body, for the finger to grip the mouse body in a natural hand posture with minimal flexion or strain on the hand's musculoskeletal structure as illustrated in the following points:

FIG. 2 shows how the ergonomic mouse embodied in FIG. 1 is held in a user's hand and illustrates, in one configuration with the right hand, the way the four click buttons in the design, located on the bottom side of the front contoured protruding part, and are in contact with each fingertip 202 in a clutch grip configuration. In this configuration, the scroll wheel button is hidden behind the thumb 204, and the two function buttons 112 are located on opposite sides of the scroll wheel button, in an upper and lower position, which allows ease of access and activation of the different functions programmed in these buttons using the thumb.

Figure 3:
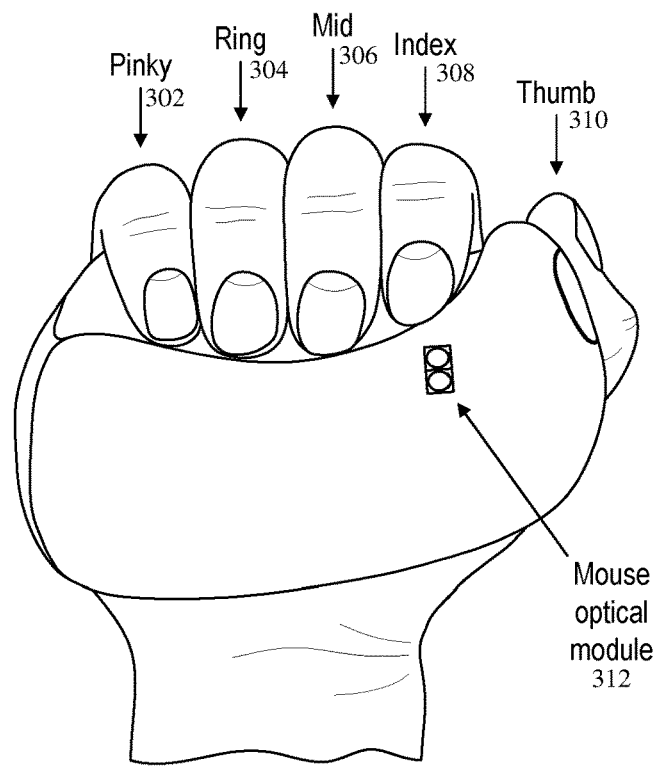
FIG. 3 shows a bottom view of the clutch grip that the embodiment of FIG. 1 design allows the user to perform.

FIG. 3 shows a bottom view of the clutch grip on the ergonomic computer mouse wherein each respective finger, pinky 302, ring 304, mid 306, index 308 and thumb 310 are shown to grasp. In this configuration, the mouse optical module 312 is shifted to a position that is closer to the index finger. This minimizes the hand and wrist movements, in any given task, for a fast and more accurate positioning of the pointer on screen, which could be useful for onscreen writing and other onscreen activities.

Figure 4:
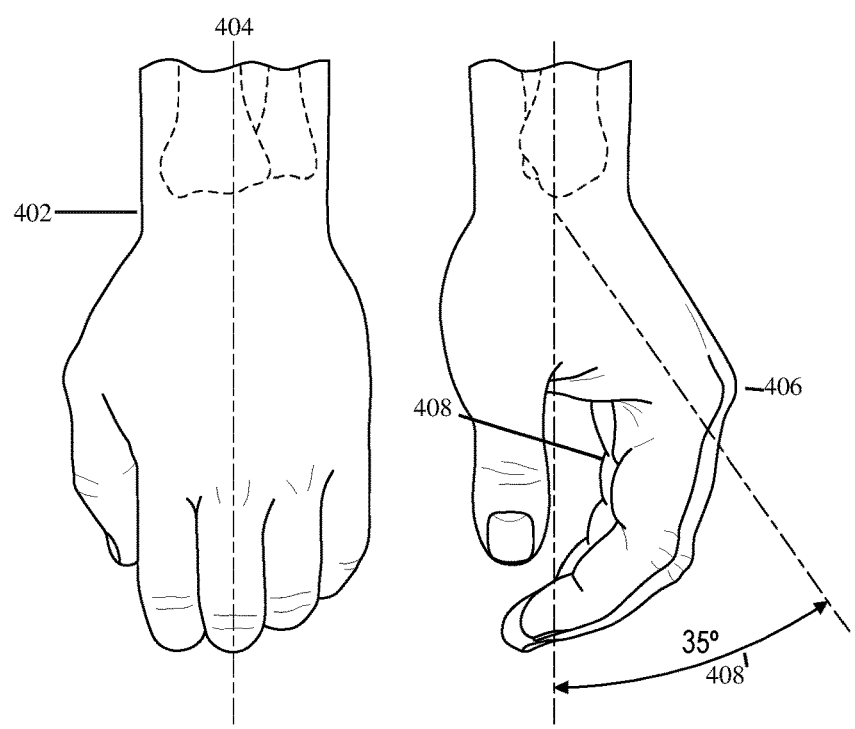
FIG. 4 (Prior Art) shows a top view and side view of the natural posture of the hand in normal position.
Figure 5:
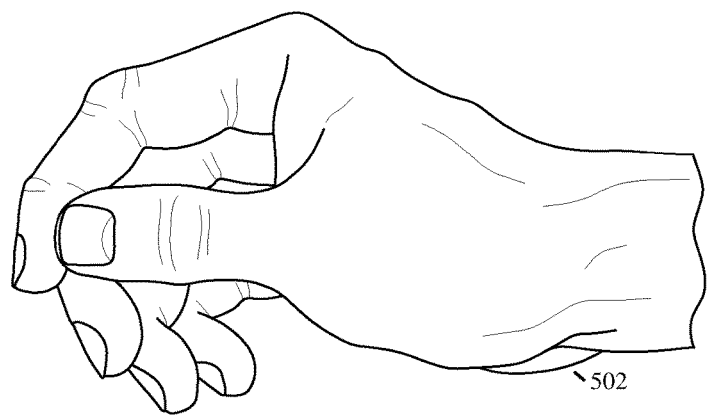
FIG. 5 (Prior Art) shows a natural finger position of the hand in normal position.
Figure 6A:
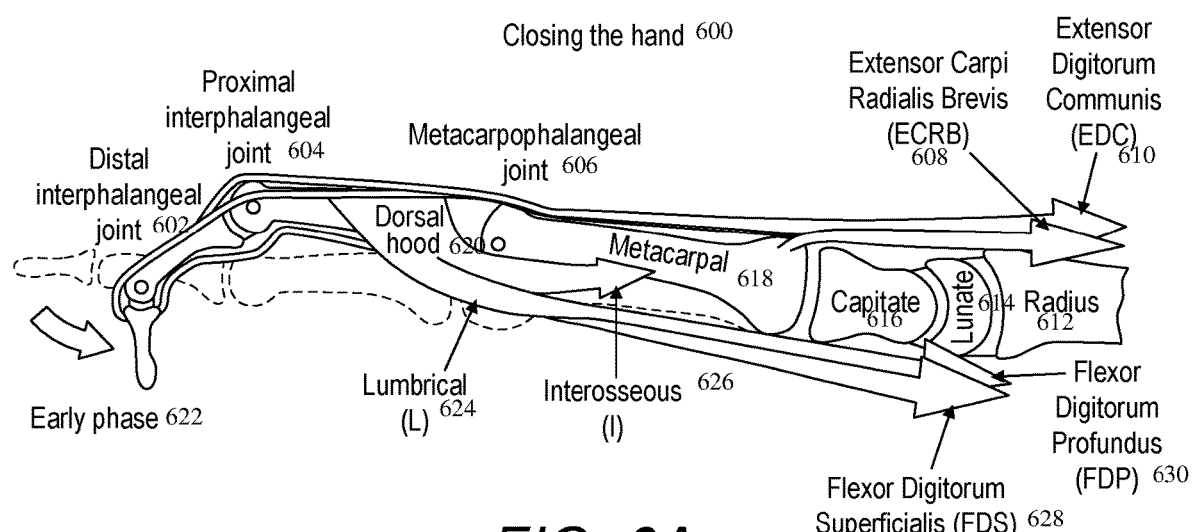

A hand at rest in a natural position will tend to be half closed, as illustrated in FIG. 4 (Taylor et. al.), with an angle of 35 degrees between the axis 404 of the forearm 402 and the outer palm 406 and inner palm 408 and this tends to be the case when the arm is in a relaxed downward position or when the forearm is resting on a surface (FIG. 5). Looking closer into the musculoskeletal structure of the hand as illustrated in FIG. 6B reveals less strain being applied on the flexors (FDP 630 and FDS 628, lower part) and the extensors (EDC 610 and ECRB 608, upper extensors), as well as the dorsal hood, when the hand is closer to its rest position as opposed to a position where the hand is open as illustrated in FIG. 6A.

Based on the above, it is therefore easier for all the fingers to reach to the mouse click buttons when these are designed in a way that adapts to the natural posture of the hand and fingers when the hand is at rest (FIG. 5) (https://www.dartmouth.edu/~humananatomy/figures/chapter_11/11-1.HTM), which results in reduced efforts and strains on the flexors and extensors (distal interphalangeal joint 602, proximal interphalangeal joint 604, metacarpophalangeal joint 606, dorsal hood 620, early phase 622, lumbrical 624, interosseous 626, metacarpal 618, capitate 616, lunate 614 radius 612 that are associated with closing of the hand 600) in the hand as described above. FIGS. 6A and 6B represents a prior art gesture for hand from (https://www.youtube.com/watch?reload=9&v=p6rRyflMfAI).

Figure 8:
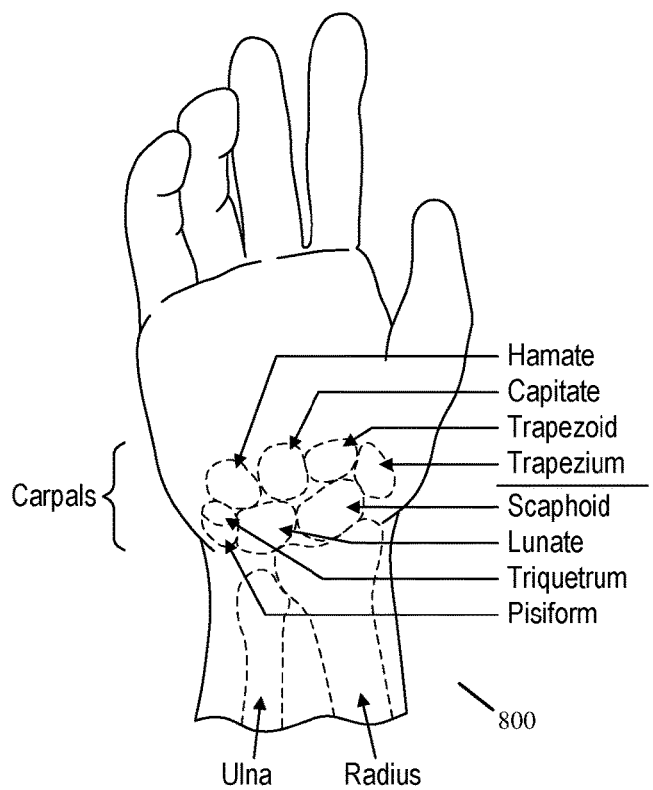
FIG. 8 (Prior Art) shows various wrist bones that are involved and that can get affected due to prolonged unhealthy computer mouse usage.

Additionally, in the proposed novel design, the pressure on the wrist bones (or Carpals as illustrated in FIGS. 7A and 7B) due to the ulnar flexion 702 and radial flexion 704 will be reduced as a result of shifting the optical module to a position closer to the index finger (https://www.expert-tabletennis.com/improve-forehand-loop-wrist). As illustrated on the left schematic below, the lateral angles of rotations for ulnar and radial flexion vary between 30 and 20 degrees. Shifting the optical module to a position closer to the index finger will result in reduced angles for both flexions, and hence less pressure exerted between the wrist bones and the Ulna and Radius bones 800, which eliminates a major cause for wrist discomfort and injuries. This is illustrated in FIG. 8 with various wrist bones such as hamate, capitate, trapezoid, trapezium, scaphoid, lunate, triquetrum, pisiform which make up the carpals (https://www.youtube.com/watch?v=3aIHxXqKzcU). This is particularly true for those carpals close to the little finger and the thumb.

Figure 9:
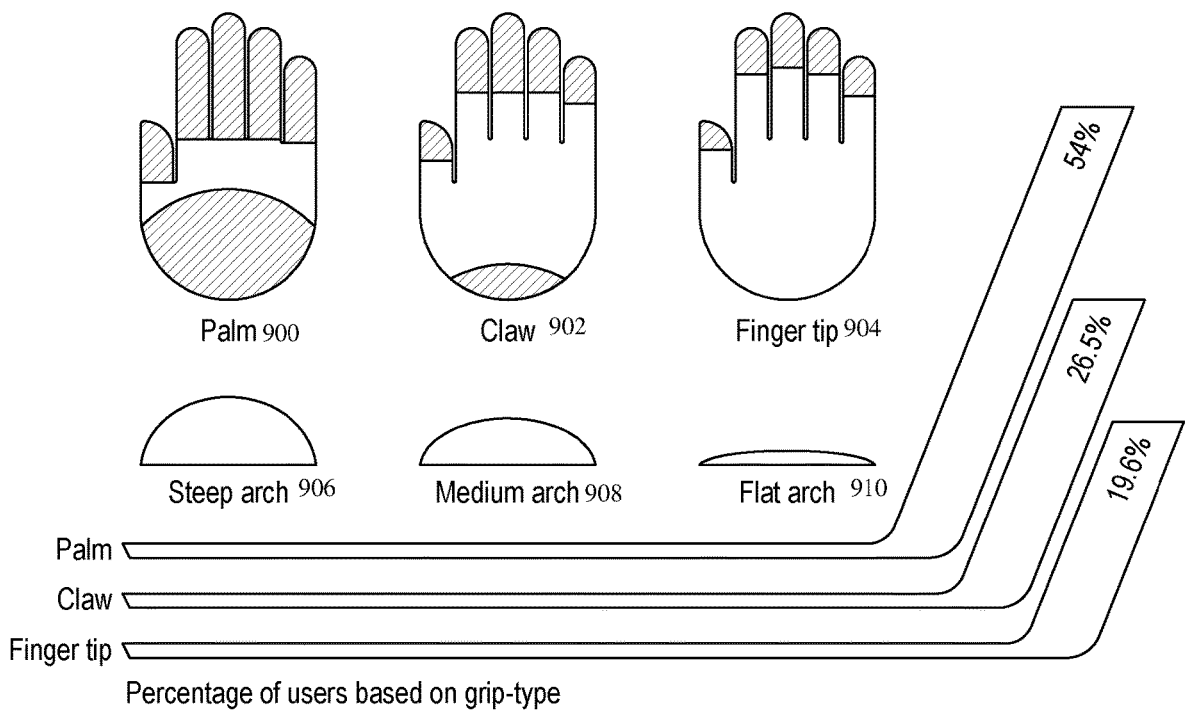
FIG. 9 (Prior Art) shows various types of grips used by user for existing mouse designs.

The three main types of mouse grips mentioned in the background section are further discussed below. The schematic shown in FIG. 9 represents the contact surface of the hand using the three different types of computer mice. It is to be noted that the larger the contact surface between the palm 900 and the mouse back arch 906 the better the comfort for the hand for prolonged stretches of time (https://vkehe45v84w20n29n1m63wok-wpengine.netdnassl.com/wp-content/uploads/2018/02/Gaming-Mouse-Grip-Styles.png). The maximum contact surface would correspond to a fully rested hand on the mouse body. This, on the other hand, will result in a reduced pointer precision for larger contact surfaces like the palm grip as compared to the other two grips.

Furthermore, although larger contact surfaces between the palm and the mouse offer better comfort for the hand, as illustrated in FIG. 9, it also depends on the mouse arch curvature 906. In fact, for prolonged usage, and in the case of the claw grip 902, it is recommended to use a mouse with a medium back arc 908. This is to prevent raising the wrist bones to unnatural positions whereby the ulnar and radial flexions result in reduced angles of flexions, forcing strenuous extra movements the hand has to accomplish in order to generate the desired displacement of the mouse pointer on the computer screen. This can be a major cause for wrist injuries. Fingertip 904 based designs have a flat arch 910 and fewer people use this grip. All three types of grips create injury in prolonged extensive usage as illustrated by the musculoskeletal structures in FIGS. 6, 7 and 8 showing the amount of strains and flexions on the hand flexors and the wrist bones.

Another reason for the resulting hand and wrist injuries, as described above, lies in the fact that most computer mice are designed with a symmetric body. The musculoskeletal structure and morphology of the hand and the palm are by no means symmetric. The hand is therefore held in an unnatural position and posture as a result through a continuous effort to adapt to the symmetric design of the computer mouse. The proposed novel ergonomic computer mouse design is not symmetric and seamlessly adapts to both the natural posture of the hand at rest and also to the morphology of the hand and palm. There is no back arch in the proposed design, which means the palm and wrist rest at a more natural lower position. Additionally, mouse clicks require minimum flexions as the click buttons are closer to the fingers when the hand is in a near resting position.

The combination of the two key features above results in a maximum contact surface between the hand and the proposed novel ergonomic mouse for an enhanced comfort user experience for prolonged stretches of time. Comfort for the wrist is further enhanced by moving the optical module to a position closer to the index finger, thus reducing the ulnar and radial flexion angles and strain between the carpals and ulna and radius bones. Additionally, both left and right handed users can equally benefit from the same level of comfort and user experience offered by the novel ergonomic design.

Finally, another key feature of the proposed design is the shifting of the optical module to a position closer to the index finger which further enhances precision in terms of position and control, and also minimizes the movements of the hand to achieve any given task. This is particularly true for tasks which require prolonged stretches of time like gaming, computer graphics and design, or other more advanced and sensitive applications like onscreen handwriting and pixel accurate software's and games.

The proposed design as shown in FIG. 2, allows the palm to comfortably rest on the back of the mouse allowing for all the fingers to have a good grip of the entire mouse body. This gives the possibility to engage all the fingers when interacting with a computer through the use of two function buttons, positioned above and under a scroll wheel button with all three easily accessed by the thumb, as well as four click buttons for the rest of the four fingers. Combining the two function buttons with the other four click buttons can generate more than thirty combinations which could be programmed to execute specific commands on computer screen or any other external device or interface. This could range from simple page scrolling through a two finger gesture to a more advanced 3D interaction and space navigation like walk through, elevation, and space fly over and rotations in all 3D directions. These advanced functionalities are only possible through the use of dedicated 3D computer mice or space navigation remote controls, which are often used in combination with a standard mouse.

There are three main types of computer mice based on the grip style. These are the palm grip, the claw grip and the fingertip grip as illustrated on FIG. 9. Each one of these grip style computer mice has its advantages, in terms of comfort for the hand, the user experience and the accuracy depending on the application, and disadvantages based on the same criteria.

The said computer mouse is based on a new grip concept we termed "clutch grip" as embodied in FIGS. 1, 2 and 3. This new concept design allows for the hand to grab hold of the mouse body completely, allowing the palm to rest comfortably on the back of the mouse while the fingers and thumb can all be engaged in operating the mouse through the combination of two function buttons and a scroll wheel button easily accessible by the thumb, as well as four click buttons for the rest of the fingers. As opposed to the other three grip styles listed above, the present design offers maximum comfort for prolonged usage by enhancing the contact surface between the palm and the mouse as described above, as well as a higher accuracy and precision, as a result of shifting the position of the mouse optical module to a position that is closer to the index finger click button as illustrated in FIG. 3. This can be very useful and practical for computer tasks which require high accuracy like onscreen writing or pixel accurate applications, as well as procuring enhanced levels of control for any 2D or 3D-based applications.

In terms of space and 3D navigation, and for a seamless user experience, it is often required to combine the use of 3D mice or space navigation controllers with a standard mouse. The instant ergonomic computer mouse can reproduce the same user experience with one single device by using a combination of easy-to-reach click buttons with hand gestures which can result in over 30 possible programmable combinations. The computer mouse device (also stated as mouse, device or ergonomic computer mouse throughout the application), as illustrated in FIG. 1, contains two function buttons located above and below a scroll wheel button, with all three easily accessible by the thumb, as well as four click buttons for the other four fingers.

The instant design comprises of another advantage that both right and left handed users can equally benefit from the design. The mouse body can also be made big or small to accommodate all hand sizes. Additionally, in another advantageous embodiment, the control hardware and software can be designed to allow pairing two units of the novel computer mouse, one for left hand and the other for the right, for applications which require the usage of both hands like video gaming and some other more immersive computer applications including but not limited to the remote control of apparatus for medical or industrial applications, as well as virtual and augmented reality interfaces. For these applications, and in a particular embodiment, the novel computer mouse could be equipped with feedback force sensors which cause vibrations to the mouse body giving users a more realistic sense of both space and the forces involved in the interaction. Finally, in another particular embodiment, the pairing of two computer mice for two hands operation can lead to at least doubling the number of possible combination of gestures described above and further detailed below.

In one embodiment, a skin could be moulded to cover the body of the mouse according to the user's specific palm features for an extra comfort for prolonged user experiences. In another embodiment, decorative skins, with different designs and patterns, could also be envisaged to cover the mouse body for a more customizable and appealing appearance, very much like the skins current smart phones or Microsoft Xbox Controllers have.

In an advantageous embodiment, the said computer mouse can be operated under any computer, portable or handheld device operating system in order to run any application under these platforms. These include, and are not limited to, Microsoft Windows, Apple MacOS, UNIX or Linux for personal computers or stations, as well as Google Android or Apple iOS operating systems for smart phones, iPads and tablets.

In another advantageous embodiment, the instant computer mouse device can be used to remotely and accurately operate and control different types of apparatus or equipment. These include, and are not limited to, instruments for medical applications, drones for more precise space maneuvering, robots for security or industry applications, as well as space and 3D navigation in virtual (VR) or augmented reality (AR) environments.

In a particular embodiment, the instant computer mouse device can serve as an educational enabling tool for children, taking the learning experience on computer to another level and helping children with learning difficulties, or disabilities, to interact with computers or learning devices in a more intuitive and user friendly way.

Finally, in another particular embodiment, the instant computer mouse device can help computer users with hand and wrist injuries to carry on with part of their computer-based activities with a minimal effect, thanks to the computer mouse design which minimizes the effort and flexions on the hand and wrist, and maintains the hand in a near resting posture, as discussed in previous sections on the biomechanics of the hand. In this respect, and for this particular embodiment, even a solid non-functional molded or cast model of the proposed design as illustrated in FIG. 1, and without any of the functionalities listed above, can serve as a support for a healthy hand posture for those suffering hand or wrist injuries caused by extensive computer mouse usage.

FIGS. 10A, 10B, 10C, 10D, 10E, 10F, 10G, 10H, 10I, 10J, 10K, and 10L embody some of the various combinations of finger aided touch control centers, including the four finger click-buttons, the scroll wheel button and the two function buttons, with the standard hand gestures moving left/right or forward/backward, or a combination of either of those, in a clutch grip configuration, as proposed in the instant computer mouse device. It is important to note that these combinations are possible by using only one standard optical sensor, similar to the ones used in all standard optical computer mice. There are even more possibilities of gestures with a design that includes a gyro and an optical sensor, in which case the mouse could be lifted off the surface for space and 3D interaction, or even a design with two optical sensors which would offer an additional degree of freedom and an enhanced level of precision. Moreover, the position of the optical mouse in FIG. 10 is kept close to the center of the base of the mouse body, similar to most computer mice designs on the market. This is only done for the sake of illustration and as such is not limiting the computer mouse device scope here described. The preferred location for this computer mouse device would be to have the optical module shifted to a position that is closer to the index finger, as detailed in one preferred embodiment above.

In the descriptions of all FIGS. 10A to 10L below, it will be understood that the design allows the thumb to access both the scroll wheel click-button and the two upper and lower function buttons, while the other four fingers can only access the click-buttons assigned to them. In this configuration dictated by a preferred embodiment of the design, over 60 possible functions can be programmed when combining the four fingers clicks, the thumb clicks on either the scroll wheel click-button or the two upper or lower function buttons, with the different hand gestures corresponding to the mouse body moving to the left/right, forward/backward, or a combination of either moves. As detailed below, these combinations are offered by a design which has only one optical mouse. Finally, it will also be understood that all the combinations described below can be repurposed or programmed to achieve specific functions depending on the user's needs or applications as described below.

In the next sections, the descriptions of the possible combinations and functions using this computer mouse device will start with the functions that could be assigned to each one of the four finger click-buttons, scroll-wheel button, as well as the function-buttons individually, then will address combinations of more than one finger click-button with gestures, and finally the combinations that involves one or more than one of the four finger click-buttons with the use of either one of the function buttons, along with gestures as the mouse is moved left/right, forward/backward or a combination of either of these gestures. The different combinations and functions described represent an illustration of the different possibilities of the instant invention and are, henceforth, not limiting the scope of the invention. In addition, only combinations and gestures that minimize the strain on the hand and wrist in terms of flexion on the muscles and tendons are described in this description. In this context, the plurality and applications of these gestures, further multiplied when combining the keyboard Ctrl, Shift, or Alt keys on Microsoft Windows computers, or the Command, Shift or Control keyboard keys on Apple MacOS computers are also described in this instant description. Additionally, more possible combinations and functions corresponding to a design which includes a gyro, in addition to a standard mouse optical module, are described in this description. Finally, more combinations and functions could be envisaged by pairing and combining two units of the instant computer mouse device as embodied in FIG. 1, in a configuration where both the left and right hands operate either independently or in tandem a separate unit of the instant computer mouse device, for a more immersive and enhanced interaction with computers or apparatus.

Figure 10A:
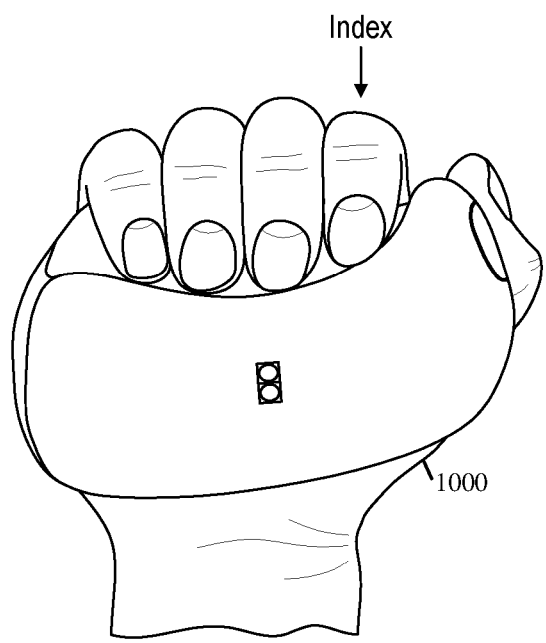
FIGS. 10A, 10B, 10C, 10D, 10E, 10F, 10G, 10H, 10I, 10J, 10k, and 10L shows various combinations of finger aided touch control centers and use of the clutch grip, illustrating some of the functionalities of in the instant computer mouse device embodiment of FIG. 1.

FIG. 10A shows a programmable use of one finger click-button assigned to the index finger, in a single or double click configuration, which could be programmed to execute different tasks or instructions. This programmable one finger click-button assigned to the index finger can emulate the standard uses of a computer mouse left click-button functions, namely, the simple left click, the usual double click as well as the drag and drop functionality. This is what most computer users are accustomed to when using the index finger. This one finger click-button can also be reprogrammed to serve other purposes according to the user's needs or applications. It could for instance serve as the right click function that is in standard computer mice instead of the left click as described above.

Figure 10B:
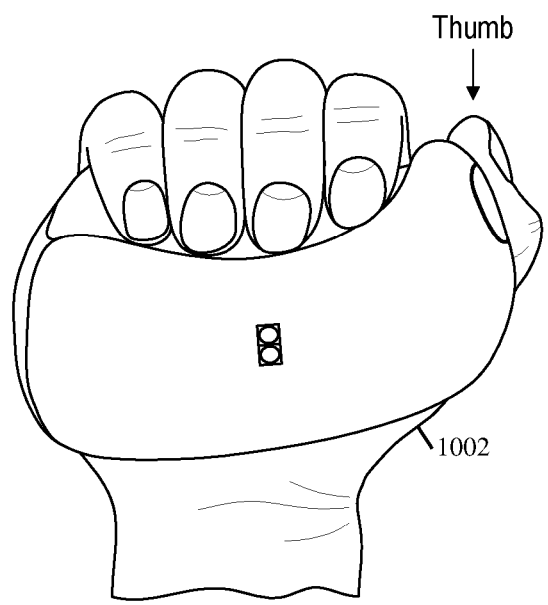

FIG. 10B shows a programmable use of the thumb acting on the scroll wheel click-button, in a single or double click configuration, which could be programmed to execute different tasks or instructions. This programmable scroll wheel click-button could emulate a single click, which could be either the left or right click of a standard computer mouse depending on the user's preference and convenience, a double click or even the drag and drop functionality as assigned to the index finger click-button described above.

Figure 10C:
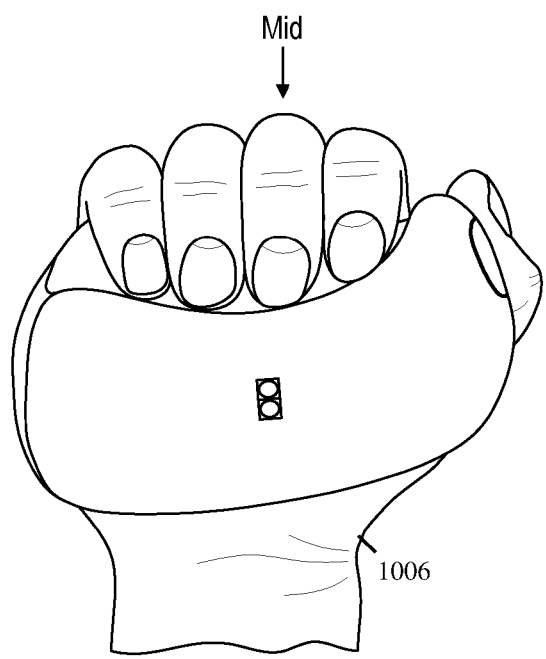
Figure 10D:
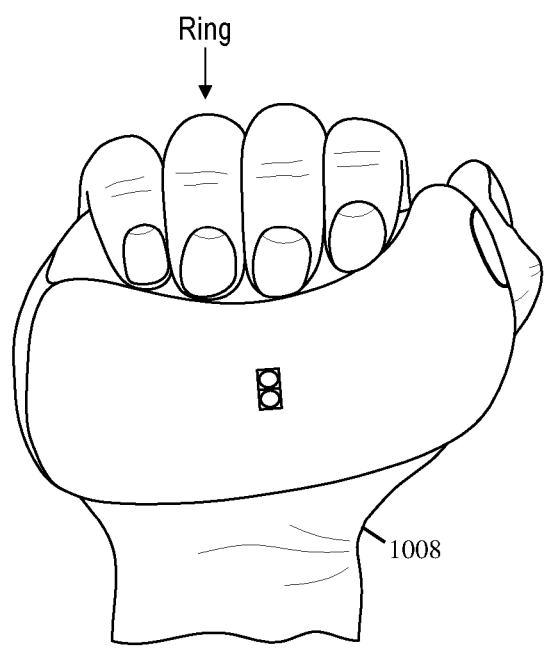
Figure 10E:
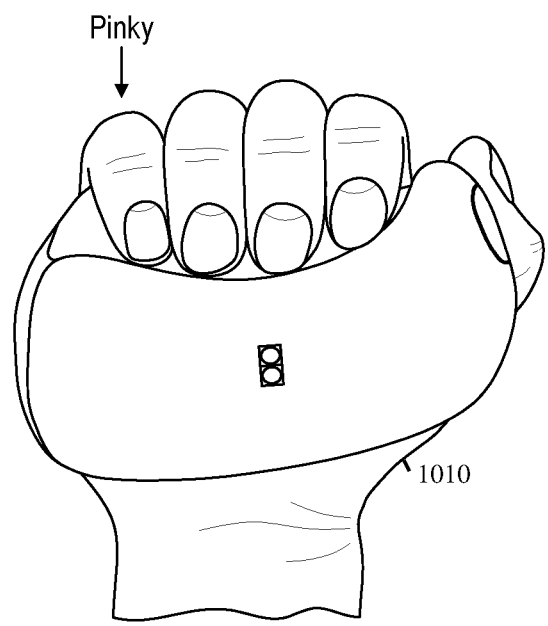

The same functions assigned to the index finger and thumb, as described above and illustrated in FIGS. 10A and 10B, could be assigned to the other three fingers as illustrated in FIG. 10C for the middle finger, FIG. 10D for the ring finger, and FIG. 10E for the little finger.

In a configuration where the thumb is being used, as illustrated in FIG. 10B and where the thumb can also access the two function buttons and not just the scroll wheel-button as described above, a single click on the upper function button using the thumb could be programmed for a standard Undo instruction. A Double click on the upper function button could be programmed for a standard Redo instruction, while using a long press on the upper function button could be used to select the platform the mouse will be used for, for example 3D or 2D interface, or even display contextual options to choose from saved user settings set for different platforms. A single click on the lower function button could be used to open contextual menus which could be programmed according to the applications being used. The choice of assigning contextual menus to the lower function button is due to the fact that these menus will be accessed less frequently compared to the Undo or Redo functions descried above, and the latter are easier for the thumb to activate using the upper function button. The software would still offer the possibility to repurpose the use of the two function buttons according to the user's needs or applications.

Figure 10F:
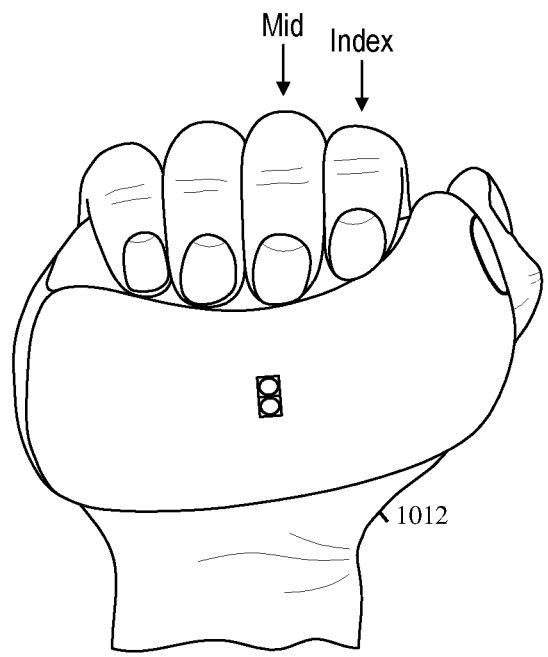
Figure 10G:
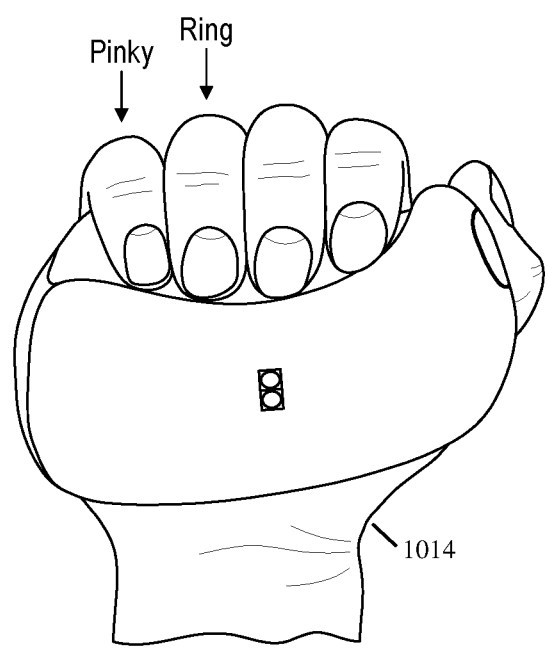
Figure 10H:
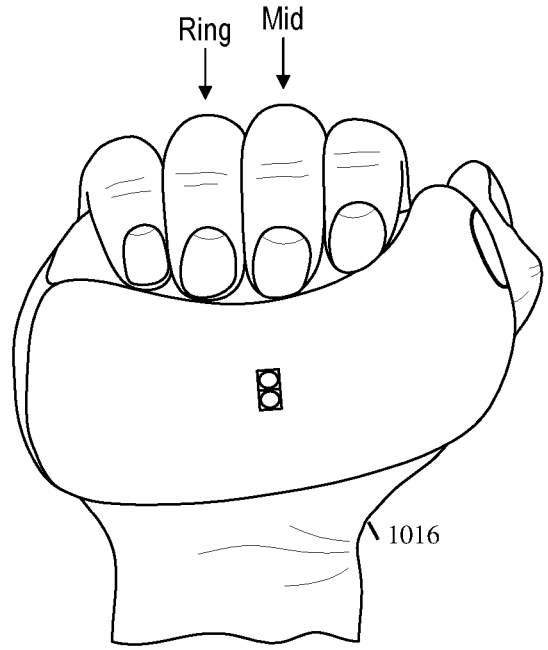

FIGS. 10F, 10G, and 10H show programmable combinations of two finger click-buttons, in a single click configuration, which could be assigned to execute different tasks or instructions, including but not limited to the right click instruction, similar to that of a standard mouse right click-button or the two finger tap on a trackpad or a clickpad, the copy/paste instructions, the formatting of text in Microsoft (or MacOS) Office documents or any other software specific shortcuts for applications which include, but not limited to, image and video processing as well as 2D or 3D-CAD tools and video games. Similarly, combinations of two finger click-buttons as illustrated in FIGS. 10F, 10G, 10H, and in a double click configuration, could be assigned to instructions similar to those described above for a single click configuration in addition to other functionalities which could be assigned using the instant computer mouse device control software. These include but are not limited to quick zoom to fit document, quick zoom on objects or text in Microsoft Office (or MacOS) documents as well as quick shortcut for graphic designs, 2D and 3D-CAD tools or video games.

In addition to the programmable combinations of two finger click-buttons, in a single or double click configurations described above and illustrated in FIGS. 10F, 10G, and 10H, other combinations of two finger click-buttons could be envisaged; these are illustrated in FIGS. 10A, 10C, 10D and 10E. In these added combinations of two fingers clicks, the user combines the use of one of the four finger click-buttons with the scroll wheel-button. These combinations may however seem less intuitive when compared to using two fingers gestures, but it will remain up to the user to repurpose these combinations to achieve similar tasks as described above or any other tasks based on the user's needs or applications.

FIGS. 10F, 10G, and 10H also illustrate programmable combinations of two finger click-buttons with hand gestures corresponding to the mouse body moving forward/backward, left/right or any combination of either moves. While using trackpads on laptop computers, or any external trackpad device coupled with a computer, a natural way of scrolling up/down pages of documents or web browsers is by using two fingers forward/backward swipes on the trackpad surface. Using the instant computer mouse device, a two-finger click, corresponding to the activation of two click-buttons using any combination of two fingers as illustrated in FIGS. 10F, 10G, and 10H, combined with a forward/backward move of the mouse body can reproduce the same two finger scroll using a trackpad as described above, to scroll up or down pages in applications in Microsoft Windows, Apple MacOS, iOS, Google Android or any other operating system. Similar to the above description for scrolling up/down pages using any combination of two fingers, a two-finger click, as illustrated in FIGS. 10F, 10G, and 10H, combined with a left/right move of the mouse body can reproduce the same effect of a two finger left/right swipe using a trackpad. With the instant computer mouse device, this gesture could for instance be used to dynamically move any given page to the left/right on any given electronic document or web browser in Microsoft Windows applications. In MacOS applications, this same two finger gesture could be used to swipe between pages, swipe between full-screen apps or show/hide the notification center in a very similar way this operates on a trackpad. These examples are mentioned for the sake of illustrating the possibilities of the instant computer mouse device, and as such are not limiting the scope of the computer mouse device. The user will always be given the flexibility to repurpose these combinations using the instant computer mouse device control software according on the user's needs or applications.

Additionally, the same combination of two finger clicks with a forward/backward move of the mouse body, as described above, could be used in many other different ways depending on the interface or application being used. As an illustration, not limiting the scope of the instant computer mouse device, the two finger click with a forward/backward move of the mouse body could be used for dynamic zoom in/out in 3D CAD applications or any 3D interface. In the latter applications, using the two finger click while moving the mouse body to the left/right could be used for dynamic move or pan of objects to the left/right. The instant computer mouse device control software would still offer the possibility to remap and repurpose the use of the two finger clicks with the left/right or forward/backward, according to the user's needs, for applications including but not limited to webpage browsing backward/forward, Microsoft Office documents editing undo or redo, and different possible combinations for apparatus control or video gaming.

In addition to the programmable combinations of two finger click-buttons with hand gestures corresponding to the mouse body moving forward/backward, left/right or any combination of either moves, described above and illustrated in FIGS. 10F, 10G, and 10H, other combinations of two finger click-buttons could be envisaged; these are illustrated by FIGS. 10A, 10C, 10D and 10E. In these added combinations of two fingers gestures, the user combines the click of one of the four finger click-buttons with the scroll wheel-button (using the thumb) while moving the mouse body in the same way described above. These combinations may however seem less intuitive when compared to using the two fingers gestures on a trackpad or click pad, but it will remain up to the user to program these combinations using the instant computer mouse device control software to reproduce similar tasks or functions as described above or any other tasks based on the user's needs or applications.

Finally, while all the different combinations of two finger gestures described above rely solely on the mouse click buttons with hand gestures, the plurality of these combinations could be further multiplied and expanded to generate more possible functions when combining the keyboard Ctrl, Shift, or Alt buttons on Windows computers, or the Command, Shift or Control keyboard buttons on MacOS computers. As an illustration, combining the keyboard Ctrl key on a Microsoft Windows based computer with a two finger click and a forward/backward hand gesture could be used to dynamically zoom in/out in Microsoft Office documents, web browsers or any other application for a smoother viewing and interactive experience. Other illustrations, combining the different keyboard keys listed above for Microsoft Windows and MacOS with the two-finger gestures, include and are not limited to dynamically rotating an image, dynamically rotating or resizing graphical objects as well as dynamically zooming in/out the entire screen for visually impaired users.

Figure 10I:
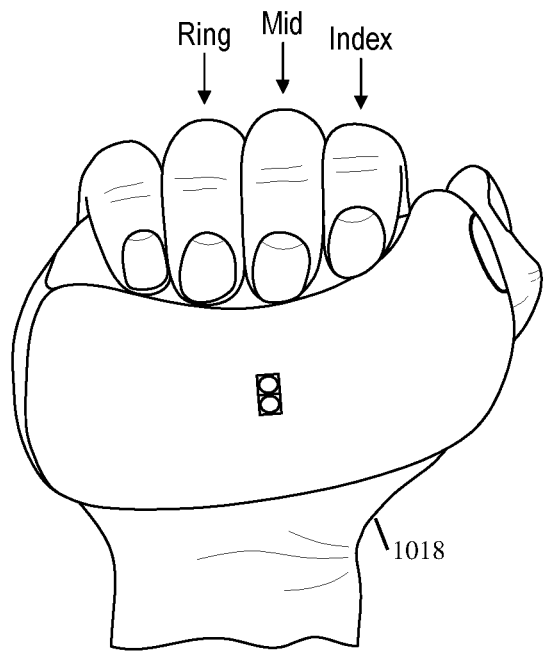
Figure 10J:
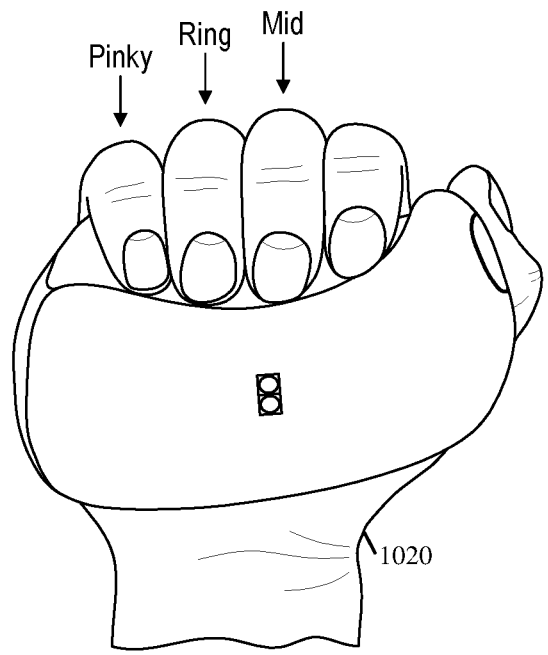

FIGS. 10I and 10J show programmable combinations of three finger click-buttons, in a single or double click configuration. Other combinations of three finger click-buttons could be envisaged; these are illustrated by FIGS. 10G, 10G and 10H. In these added combinations of three finger clicks, the user combines the click of two (out of the four) finger click-buttons along with the scroll wheel-button (using the thumb). These pluralities of possible three finger click combinations could be assigned to different tasks according the user's needs or application. As an illustration, a three finger tap on a trackpad in Microsoft Windows 10 is used to open Cortana. It is thus possible to assign a three finger click for the same purpose using the instant computer mouse device.

FIGS. 10I and 10J also illustrate programmable combinations of three finger click-buttons, in a single click configuration, with hand gestures corresponding to the mouse body moving forward/backward, left/right or any combination of either move. While using built-in or external trackpads or click pads on Microsoft Windows or Apple MacOS computers, three finger gestures are for instance used to move between document pages, move to previous/next images in image galleries or previous/next web pages in web browsers in Apple MacOS, or to see all open windows, show the desktop, or even switch between open windows in Microsoft Windows. Using the instant computer mouse device with the three-finger gestures as illustrated in FIGS. 10I and 10J and described above, the same three finger gestures achieved using built in or external trackpads or click pads on either Microsoft Windows or Apple MacOS as described above can be reproduced. Similar gestures could be applied in other operating systems including but not limited to UNIX, Linux, Apple iOS, Google Android or any other operating system.

In addition to the programmable combinations of three finger gestures using the instant computer mouse device, which have been detailed above and illustrated in FIGS. 10I and 10J, other combinations of three finger gestures could be envisaged; these are illustrated in FIGS. 10F, 10G and 10H. In these added combinations of three fingers gestures, the user combines the click of two (out of the four) finger click-buttons along with the scroll wheel-button (using the thumb) while moving the mouse body in the same way described above. These combinations may however seem less intuitive, compared to using the three fingers gestures on a trackpad or a click pad, with the exception however of the configuration illustrated in FIG. 10H which naturally mimics holding a pen or stylus for handwriting. This three finger gesture could thus be programmed for onscreen handwriting, matching the shifted position of the mouse optical module as described above for an enhanced quality and precision of handwriting using the instant computer mouse device. It would still remain up to the user to remap or repurpose these gestures using the mouse software to reproduce similar tasks or functions as described above, or any other function based on the user's needs or applications.

The plurality of three fingers gestures described above could be applied in a different way if the instant computer mouse device is for instance used to control apparatus. These include and are not limited to medical instruments, drones, robots, as well as interacting with virtual or augmented reality environments. The control software of the instant computer mouse device will give the flexibility to remap or repurpose the use of these gestures at will, based on the user's needs or applications.

Furthermore, while all the different three finger gestures described above rely solely on the combination of this computer mouse device click buttons with hand movements, the plurality and applications of these gestures could be further multiplied when combining the keyboard Ctrl, Shift, or Alt keys on Microsoft Windows computers, or the Command, Shift or Control keyboard keys on Apple MacOS computers. As an illustration, combining the keyboard Ctrl key on a Microsoft Windows computer keyboard with a three finger click and a forward/backward hand gestures could be used to dynamically browse the history in changes made Microsoft Office documents, 2D drawings or 3D-CAD complex assemblies, web browser pages, image or video editing, or dynamically move through open windows in any given Microsoft Windows based application for a smoother viewing and interactive experience. Similar illustrations to the above could be reproduced using the Command, Shift or Control keyboard keys on Apple MacOS computers. The added possible combinations and functionalities, when combining the three keyboard control keys in Microsoft Windows or Apple MacOS as described above, could all be included within the control software of the instant computer mouse device, giving the flexibility to remap or repurpose the use of these added functionalities at will, based on the user's needs or applications.

Finally, the same combinations of three finger gestures as described above and illustrated in FIGS. 10I, and 10J, could be used in many other different ways depending on the interface or application. In this configurations, and as an illustration, not limiting the scope of the instant computer mouse device, a three finger click with a forward/backward, left/right, or any combinations of either moves of the mouse body could be used to rotate or spin objects or complex assemblies forward/backward, left/right, or any combinations of either directions, in 3D CAD applications or any 3D interfaces including and not limited to video games, virtual or augmented reality. The instant computer mouse device control software would still offer the possibility to remap and repurpose the use of the three finger gestures described above according to the user's needs.

Figure 10K:
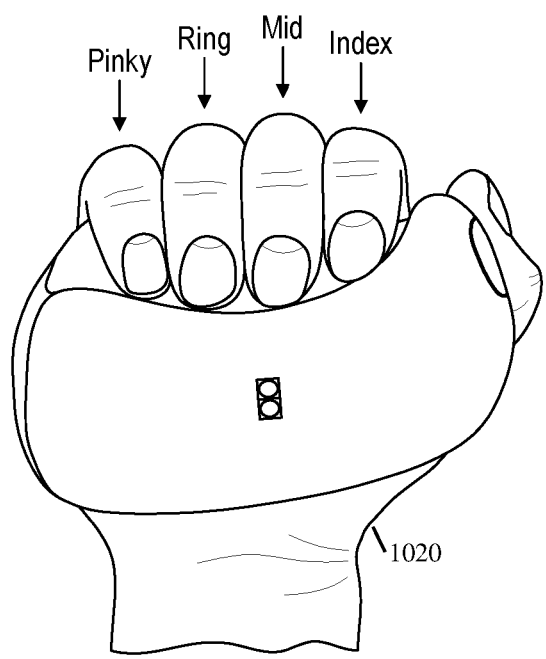

FIG. 10K shows a programmable combination of all four finger click-buttons, in a single or double click configuration. Other combinations of four finger click-buttons could be envisaged; these are illustrated by FIGS. 10I and 10J. In these added combinations of four finger clicks, the user combines the click of three (out of the four) finger click-buttons along with the scroll wheel-button (using the thumb). These pluralities of possible four finger click combinations could be assigned to different tasks according the user's needs or application. As an illustration, not limiting the scope of the computer mouse device, a four finger single or double-click, using one of the possible combinations described above, could for example be assigned to start the camera in Microsoft Windows or Apple MacOS computers or devices. Another combination of four finger single or double clicks could be used to start a messaging or a social media application. The user will always have the possibility to remap or repurpose these combinations of four finger single or double clicks at will using the instant computer mouse device control software. As another illustration of the plurality of different possible uses of the instant computer mouse device using the four finger clicks, a four fingers tap on a touchpad or click pad opens the Action Center in Microsoft Windows 10 computers. This function could be assigned to one of the three possible combinations of four fingers as described above for the instant computer mouse device.

FIG. 10K also illustrates a programmable combination of four finger click-buttons, in a single click configuration, with hand gestures corresponding to the mouse body moving forward/backward, left/right or any combination of either moves. While using built-in or external trackpads or click pads on Microsoft Windows or Apple MacOS computers, four finger gestures swiping up/down/left/right are for instance used to swipe all open applications up to show the desktop, show all open windows (MacOS Expose) or display the Application Switcher in MacOS, or to see all open windows, show the desktop, or even switch between open windows in Microsoft Windows. Using the instant computer mouse device with the four-finger gesture as illustrated in FIG. 10K and described above, the same four finger gestures achieved using built in or external trackpads or click pads on either Microsoft Windows or Apple MacOS as described above can be reproduced. Similar gestures could be applied in other operating systems including but not limited to UNIX, Linux, Apple iOS, Google Android or any other operating system.

In addition to the programmable combination of four finger gestures using the instant computer mouse device, which has been detailed above and illustrated in FIG. 10K, other combinations of four finger gestures could be envisaged; these are illustrated in FIGS. 10I and 10J. In these added combinations of four finger gestures, the user combines the click of three (out of the four) finger click-buttons, along with the click of the scroll wheel-button using the thumb, while moving the mouse body in the same way described above. These combinations may however seem less intuitive, compared to using the four fingers gestures on a trackpad or a clickpad, with the exception however of the configuration illustrated in FIG. 10I which naturally mimics the grabbing of small objects using four fingers and moving them in real life. This four finger gesture could thus be programmed as another alternative for onscreen dragging of windows, images or graphical objects without having to click on them to select them. It would still remain up to the user to remap or repurpose these gestures using the mouse software to reproduce similar tasks or functions as described above, or any other function based on the user's needs or applications.

Furthermore, while all the different four finger gestures described above rely solely on the combination of this computer mouse device's click buttons with hand movements, the plurality and applications of these gestures could be further multiplied when combining the keyboard Ctrl, Shift, or Alt keys on Microsoft Windows computers, or the Command, Shift or Control keyboard keys on Apple MacOS computers. As an illustration, and similar to the example illustrating the combination of keyboard Ctrl key with a three finger gesture described above, combining the keyboard Ctrl key on a Microsoft Windows computer with a four finger gesture, corresponding to a forward/backward or left/right hand gestures, could be used to dynamically browse the history in changes made Microsoft Office documents, 2D drawings or 3D-CAD complex assemblies, web browser pages, image or video editing, or dynamically move through open windows in any given Microsoft Windows based application for a smoother viewing and interactive experience. Similar illustrations to the above could be reproduced using the Command, Shift or Control keyboard keys on Apple MacOS computers. The added possible combinations and functionalities, when combining the three keyboard control keys in Microsoft Windows or Apple MacOS with the four finger gestures as described above, could all be included within the control software of the instant computer mouse device, giving the flexibility to remap or repurpose the use of these added functionalities at will, based on the user's needs or applications.

Finally, the same combination of four finger gestures, as described above and illustrated in FIG. 10K, could be used in many other different ways depending on the interface and/or application. In this configurations, and as an illustration, not limiting the scope of the instant computer mouse device, a four finger click with a forward/backward, left/right, or any combinations of either moves of the mouse body could be used in 3D-CAD applications, or any 3D interface including but not limited to video games, virtual or augmented reality, to move 3D objects or 3D complex assemblies forward/backward, left/right, or in any combinations of either directions. As another illustration, the same four finger gesture described above could be used to walk-through 3D virtual environments including but not limited to 3D-CAD applications, video games, as well as virtual or augmented reality. The instant computer mouse device control software would still offer the possibility to remap and repurpose the use of the three finger gestures described above according to the user's needs or applications.

Figure 10L:
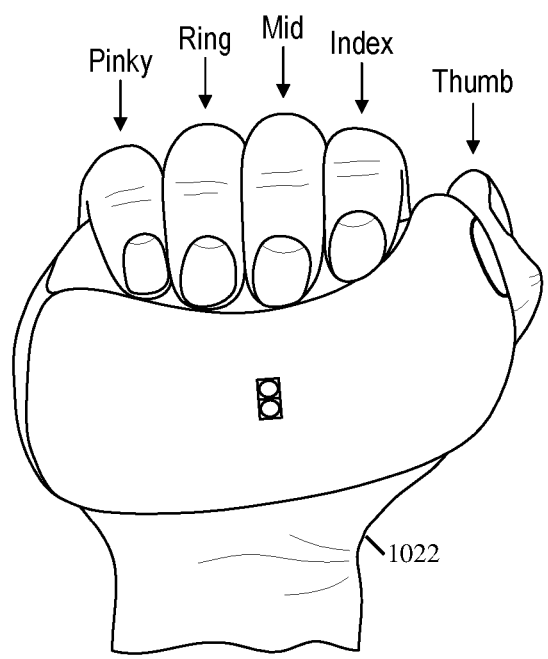

FIG. 10L shows a programmable combination involving all five fingers of the hand, in a single or double click configuration, with the thumb pressing on the scroll wheel click-button and the other four fingers pressing on the click buttons assigned to each one of them. These possible five finger click configurations could be assigned to different tasks according the user's needs or application. As an illustration, not limiting the scope of the computer mouse device, a five finger single or double-click, using the combination of all five fingers described above, could for example be assigned to a quick show desktop in Microsoft Windows or Apple MacOS computers or devices, in a very similar way the five finger gesture is used in Apple iPads to pinch the screen. The user will always have the possibility to remap or repurpose this combination of five fingers, in a single or double click configuration, when needed, using the instant computer mouse device control software.

FIG. 10L also illustrates a programmable combination of five finger click-buttons, in a single click configuration as detailed above, with hand gestures corresponding to the mouse body moving forward/backward, left/right or any combination of either moves. While using built-in or external trackpads or click pads on Microsoft Windows or Apple MacOS computers, five finger gestures are not assigned to a specific functionality, unlike the one assigned in Apple iPads to pinch the screen. Using the instant computer mouse device with the five-finger gesture as illustrated in FIG. 10L and described above, the same five finger gestures achieved using Apple iPads as described above can be reproduced. Similar gestures could be applied in other operating systems including but not limited to UNIX, Linux, Apple iOS, Google Android or any other operating system. Using the instant computer mouse device control software though, the user will always have the possibility to remap or repurpose this five finger gesture whenever needed.

Furthermore, while all the different five finger gestures described above rely solely on the combination of this computer mouse device click buttons with hand movements, the plurality and applications of these gestures could be further multiplied when combining the keyboard Ctrl, Shift, or Alt keys on Microsoft Windows computers, or the Command, Shift or Control keyboard keys on Apple MacOS computers. As an illustration, combining the keyboard Ctrl key on a Microsoft Windows computer with five finger gestures, corresponding the mouse body move forward/backward or left/right, could be used to dynamically browse through all open applications, with a full size preview of the applications, and then release the fingers when the application of interest is found. Another illustration combining the keyboard Alt key on a Microsoft Windows computer with five finger gestures could be used to browse through customizable contextual menus which could include quick access to onscreen numeric pad, for quick onscreen numeric input on Microsoft Excel or any other applications, onscreen keyboard, calculator, or even quick access to messaging using small onscreen panes. Further illustration combining the keyboard Shift key on a Microsoft Windows computer with five finger gestures could be used to move pages in 2D drawings or dynamically moving complex 3D-CAD assemblies by just hovering the pointer over the objects without selecting them making the process seem more natural and intuitive. Similar illustrations to the above could be reproduced using the keyboard Command, Shift or Control keys on Apple MacOS computers. The added possible combinations and functionalities, when combining the three keyboard control keys in Microsoft Windows or Apple MacOS as described above, could all be included within the control software of the instant computer mouse device, giving the flexibility to remap or repurpose the use of these added functionalities at will, based on the user's needs or applications.

Finally, the same five finger gestures as described above and illustrated in FIG. 10L, could be used in many other different ways depending on the interface or application. In this configurations, and as an illustration, not limiting the scope of the instant computer mouse device, a five finger click with a forward/backward, left/right, or any combinations of either moves of the mouse body could be used to lift and carry objects or complex assemblies upward/downward, left/right, or any combinations of either directions, in 3D CAD applications or any 3D interfaces including but not limited to video games, virtual or augmented reality. The instant computer mouse device control software would still offer the possibility to remap and repurpose the use of the five finger gestures described above according to the user's needs.

In the descriptions given for FIGS. 10A to 10L above for the different possible combinations of gestures and functions that can be achieved using the instant computer mouse device, the use of the built in gyro was not included. It will be made clear that the instant computer mouse device does not intend to use the gyro in a way that is similar to the Gyration pointers and mouse devices (GYRATION, 2019), wherein the gyro is used to generate an onscreen pointer similar to the pointer generated by standard computer mice. In the instant computer mouse device, the gyro is rather intended to be used for more immersive 3D interaction in 3D-CAD applications, video games or 3D virtual or augmented realities. It is also intended to be used as a more intuitive and user friendly mean to remotely control apparatus and equipment. Additionally, all the different combinations described above, and illustrated in FIGS. 10A to 10L, did not combine the use of the function buttons as these have only been described above when used individually in a single/double click or in a long press setting. More possible combinations and functions could be envisaged and assigned to hand gestures using the instant computer mouse device when including the function buttons as well as the built in gyro. These are described in the next sections.

In the context of combining the upper function click button with the other finger click buttons, along with gestures, a programmable combination of upper function click button, where it should be understood the function click button is activated with the thumb, with the index finger click button as illustrated in FIG. 10A could be used for either accelerated or for precision motion of the pointer on screen for pixel accurate applications or games. It could also be used for interpolated line constructions for two or three dimensional design or drawing software's or applications. In this context too, and as illustrated by FIG. 10B, it is clear that the thumb 1002 cannot press on both the upper function button and the scroll wheel button at the same time, cancelling this combination as a result Similar to FIG. 10A illustrating the combination of the upper function button with the index finger described above, FIGS. 10C, 10D and 10E show programmable combinations of the upper function click button with the middle finger 1006, the ring finger 1008, as well as the pinky finger 1010. These combinations may seem less intuitive when compared to the combination with the index finger, but these could equally be used for either accelerated or precision motion of the pointer on screen or any other task control depending on the platform being used or the application.

FIGS. 10F, 10G and 10H show programmable combinations of the upper function click button with two finger click-buttons along with a forward/backward move of the mouse body. These added combinations could be used for accelerated two finger scroll 1012, 1014, 1016, for fast scrolling up or down pages of documents, in applications including but not limited to Microsoft Windows, Apple MacOS, Apple iOS, Google Android or any other operating system. The same combination of upper function click button with two finger click-buttons along with a forward/backward move of the mouse body could be used for an accelerated zoom in/out effect in 3D CAD applications, or in any 3D interface, similar to the effect generated by dedicated 3D mice, from 3Dconnexion (3dconnexion, 2019), usually used in combination with a traditional mouse for a full immersive computer interaction.

With a gyro integrated into the instant computer mouse device, and in one configuration, corresponding to the activation of the 3D working mode using a long press on the upper function button, which results in the calibration of the gyro to the vertical zero reference corresponding to the working surface area (which could be desk surface or any working surface), lifting the mouse body upward to a comfortable operating height for the user, without pressing any click button, and then moving it forward/backward while pressing the upper function button with two finger click buttons as illustrated in FIGS. 10F, 10G and 10H, would generate a more immersive zoom in/out effect. In this configuration, maintaining the upper function button pressed allows the control software to keep track (or not, according to the user's preference) of the original position of the 3D objects or assemblies in space for a more immersive interaction. In another configuration, using a very similar combination of the integrated gyro with two finger click buttons as described above and illustrated in FIGS. 10F, 10G, 10H, and after activating the 3D mode and lifting the mouse body upward to a comfortable operating height, then moving it forward/backward while pressing only two finger click buttons without the upper function button would also result in a more immersive zoom in/out effect, with the exception that this configuration does not allow the control software to keep track (or does, according to the user's preference) of the original position of the 3D objects or assemblies in space.

In addition to the above gestures combining the upper function button with two finger click buttons, along with the added functionalities of the integrated gyro, for a more immersive zoom in/out effect, other gestures using the same combination of upper function and two finger click buttons could be programmed. These correspond to either lifting the mouse body up/down, or moving it Left/right while lifted from the working surface, or any combination of either moves of the mouse body for a more immersive 3D space move of 3D objects or complex assemblies in 3D-CAD applications or any 3D environment including but not limited to video games, virtual or augmented reality. In one configuration, corresponding to the activation of the 3D working mode using a long press on the upper function button as detailed above, and then lifting the mouse body upward/downward, left/right, or any combination of either moves while pressing the upper function button with two finger click buttons as illustrated in FIGS. 10F, 10G and 10H, would generate a more immersive move of the 3D objects or assemblies up/down, left/right or in any combination of either mouse moves induced. In this configuration, maintaining the upper function button pressed allows the control software to keep track (or not, according to the user's preference) of the original position of the 3D objects or assemblies in space for a more immersive interaction. In another configuration, using a very similar combination of the integrated gyro with two finger click buttons, as described above, lifting the mouse body upward/downward, left/right, or any combination of either moves while pressing only two finger click buttons without the upper function button would also result in a more immersive move of the 3D objects or assemblies up/down, left/right or in any combination of either mouse moves effect, with the exception that this configuration does not allow the control software to keep track (or does, according to the user's preference) of the original position of the 3D objects or assemblies in space. In this second configuration, not involving the use of the upper function button, other two finger gestures could be envisaged; these are illustrated in FIGS. 10A, 10C, 10D, 10E wherein the added gestures are due to the combination of the scroll-wheel button using the thumb, as well as one finger click button.

FIGS. 10I and 10J show programmable combinations of the upper function button with three finger click-buttons 1018, 1020, along with a forward/backward, left/right, or any combination of either moves of the mouse body. These added combinations could be used for accelerated dynamic effects of moves between document pages, moves to previous/next images in image galleries or previous/next web pages in web browsers, or even switch between open windows in applications including but not limited to Microsoft Windows, Apple MacOS, Apple iOS, Google Android or any other operating system. The same combination of upper function button with three finger click-buttons along with a forward/backward, left/right, or any combination of either moves of the mouse body, could be used in 3D CAD applications, or in any 3D interface, for a dynamic accelerated rotation or spin effect of 3D objects or complex 3D assemblies in a direction forward/backward, left/right, or any combinations of either directions of rotation. A similar effect could only be generated by dedicated 3D mice, like those from 3Dconnexion (3dconnexion, 2019), usually used in combination with a traditional computer mouse for a full immersive computer interaction.

With a gyro integrated into the instant computer mouse device, and in one configuration, corresponding to the activation of the 3D working mode using a long press on the upper function button as described above, and then lifting the mouse body upward to a comfortable operating height after releasing the function button, moving the mouse body forward/backward while pressing the upper function button with three finger click buttons, as illustrated in FIGS. 10I and 10J, would generate a more immersive, dynamic and accelerated rotation or spin effect of 3D objects or complex 3D assemblies in a direction forward/backward, left/right, or any combinations of either directions of rotation. In this configuration, maintaining the upper function button pressed allows the control software to keep track (or not, according to the user's preference) of the original orientation of the 3D objects or assemblies in space for a more immersive interaction. In another configuration, using a very similar combination of the integrated gyro with three finger click buttons as described above and illustrated in FIGS. 10I and 10J, and after activating the 3D mode and lifting the mouse body upward to a comfortable operating height, then moving it forward/backward while pressing only three finger click buttons without the upper function button would also result in a more immersive, dynamic and accelerated rotation or spin effect of 3D objects or complex 3D assemblies in a direction forward/backward, left/right, or any combinations of either directions of rotation, with the exception that this configuration does not allow (or does allow, according to the user's preference) the control software to keep track of the original position of the 3D objects or assemblies in space. In this second configuration, not involving the use of the upper function button, other three finger gestures could be envisaged; these are illustrated in FIGS. 10F, 10G, 10H, wherein the added gestures are due to the combination of the scroll-wheel button using the thumb, as well as two finger click buttons.

FIG. 10K shows a programmable combination of the upper function button with four finger click-buttons 1022, along with a forward/backward, left/right, or any combination of either moves of the mouse body. These added combinations could be used for accelerated dynamic effects of moves between virtual desktops, dynamic moves to previous/next images in image galleries, or even dynamic switch between open windows in applications including but not limited to Microsoft Windows, Apple MacOS, Apple iOS, Google Android or any other operating system. The same combination of upper function button with four finger click-buttons along with a forward/backward, left/right, or any combination of either moves of the mouse body, could be used in 3D CAD applications, or in any 3D interface, for a dynamic accelerated move or walkthrough a 3D environment in a direction forward/backward, left/right or any combination of either moves, in 3D CAD applications or any 3D interface, including but not limited to video gaming, virtual or augmented reality. A similar effect could only be generated by dedicated 3D mice, like those from 3Dconnexion (3dconnexion, 2019), usually used in combination with a traditional computer mouse for a full immersive computer interaction.

With a gyro integrated into the instant computer mouse device, and in one configuration, corresponding to the activation of the 3D working mode using a long press on the upper function button as described above, and then lifting the mouse body upward to a comfortable operating height after releasing the function button, moving the mouse body forward/backward while pressing the upper function button with four finger click buttons, as illustrated in FIG. 10K, would generate a more immersive, dynamic and accelerated move or walkthrough a 3D environment in a direction forward/backward, left/right or any combination of either moves, in 3D CAD applications or any 3D interface, including but not limited to video gaming, virtual or augmented reality. In this configuration, maintaining the upper function button pressed allows the control software to keep track (or not, according to the user's preference) of the original position of the 3D objects or assemblies in space for a more immersive interaction. In another configuration, using a very similar combination of the integrated gyro with four finger click buttons as described above and illustrated in FIG. 10K, and after activating the 3D mode and lifting the mouse body upward to a comfortable operating height, then moving it forward/backward left/right or any combination of either moves, while pressing only four finger click buttons without the upper function button would also result in a more immersive, dynamic and accelerated move or walkthrough a 3D environment in a direction forward/backward, left/right or any combination of either moves, with the exception that this configuration does not allow (or does allow, according to the user's preference) the control software to keep track of the original position of the 3D objects or assemblies in space. In this second configuration, not involving the use of the upper function button, other four finger gestures could be envisaged; these are illustrated in FIGS. 10I, 10J, wherein the added gestures are due to the combination of the scroll-wheel button using the thumb, as well as three finger click buttons.

FIG. 10L shows a programmable combination of five finger click-buttons 1024, along with a forward/backward, left/right, or any combination of either moves of the mouse body as detailed above. With a gyro integrated into the instant computer mouse device, and following the activation of the 3D working mode using a long press on the upper function button as described above, and then lifting the mouse body upward to a comfortable operating height after releasing the function button, moving the mouse body forward/backward, left right, upward/downward or any combination of either moves, or even twisting the hand forward/backward, left/right or any combinations of either twists, while pressing the four finger click buttons as well as the scroll-wheel button, as illustrated in FIG. 10L, would generate a more immersive, dynamic and accelerated combination moves and rotation in 3D environment in all directions of space, mimicking a real life interaction with objects or assemblies in 3D CAD applications or any 3D interface, including but not limited to video gaming, virtual or augmented reality. In this configuration, the original position and orientation could be reset on the control software by pressing the upper function button once, for a more immersive interaction with the virtual environment. For an even more immersive interaction with the virtual environment, the instant computer mouse device may include feedback actuators sending feedback to the user's hand in the form of varied levels of vibrations.

As an illustration of the five finger gestures with the inclusion of a gyro as described above, whereby the five finger gestures could be set as a distinct working or interaction mode, and not limiting the scope of the instant computer mouse device, a five gestures described above, could be used to mimic a real life interaction in a virtual world, which includes the effects of grabbing, lifting, throwing, pushing, pulling, turning, twisting, for applications including but not limited to in 3D CAD applications, video games, virtual or augmented reality. In these environments, the user could even use two separate units of the instant computer mouse device, one for each of the left and right hands, and then set both to work simultaneously giving a sense of full immersion into the virtual environment. In this context, the user could secure the mouse body firmly on the hand using a strap to prevent the mouse from falling off the user's hands. FIG. 11 illustrates the concept of using two units of the instant computer mouse device showing a user in a standing position and interacting with a virtual environment, either projected on a screen or on a virtual reality headset.

All the combinations of dynamic and more immersive zoom in/out, rotations, and moves described in the previous sections are of great benefit for 3D-CAD tools including but not limited to Autodesk design product line like Inventor or AutoCAD, Dassault Systèmes SolidWorks or CATIA, PTC Creo (previously Pro/Engineer), Robert McNeel & Associates Rhino, for product design and simulation platforms including but not limited to ANSYS product line or COMSOL Multiphysics, or even for product realistic image rendering using 3D rendering applications including but not limited to Luxion Keyshot or SAP Visual Enterprise Author (previously Right Hemisphere's Deep Exploration CAD). These configurations can also be used in other contexts like video gaming or in virtual or augmented reality environments.

In addition, all the combinations shown in all figures are programmable, through the imbedded computer mouse drivers, in order to achieve specific tasks or accomplish a certain level of interaction depending on the application or platform being used. It is also important to note that combinations are chosen based on minimal strain on the tendons and finger muscles and flexors for optimal comfort. For more comfort and reduced effort and strain on the hand and wrist, it is suggested in this description to move the mouse optical module to a position closer to the position of the index finger click-button, from the mouse base side, as opposed to the standard position which corresponds to the center of the mouse base as illustrated on the right schematic of FIG. 2 above.

As an example for using the computer mouse device with several functionalities embedded into touch sensors a Single click on upper function button could be programmed for Undo instruction. Double click of upper function button could be programmed for Redo instruction. Long press on upper function button could be used to select the platform the mouse will be used for, for example 3D or 2D interface, or even choose from saved user settings set for different platforms. Single click on lower function button could be used to open contextual menus which could be programmed according to the applications being used. Programmable combination of upper function click button+1 Index finger click could be used for either accelerated or precision motion of the pointer on screen. It could be used for interpolated line construction for design or drawing on screen for example. Programmable combination of upper function click button+1 Middle finger click could be used for either accelerated or precision motion of the pointer on screen or any other task control depending on the platform being used. Programmable combination of upper function click button+1 ring finger click. Programmable combination of upper function click button+1 pinky finger click. Programmable combination of upper function click button+two finger click+forward/backward mouse move for accelerated two finger scroll, to scroll up or down, in applications in windows or MacOS operating systems using a trackpad. The same combination of upper function click button+two finger click+forward/backward mouse move could be used accelerated effect of zoom in/out in 3D CAD applications, or any 3D interface, similar to the effect generated by dedicated 3D mice usually used in combination with a traditional mouse.

The asymmetrical contoured mouse body, when made in a nonfunctional single homogeneous part, out of cast or molded materials like plastics, ceramics, metals, or softer materials like gels or elastomers, could serve as a support for a healthy hand posture for those suffering from hand or wrist injuries caused by extensive computer mouse usage or any other cause. In addition, it will be appreciated that the various shapes, configurations, contours and functionalities associated with the ergonomic computer mouse design as disclosed herein may be achieved using other means. Accordingly, the specification and drawings are to be regarded in an illustrative rather than a restrictive sense.

What is claimed is:

1. A computer mouse device with a modified design, comprising: an asymmetrical contoured mouse body is a horizontal device having a laterally elongated and down inclined contoured back surface; a protruding contoured part as an extension of the back surface towards the front of the asymmetrical contoured mouse body, for the fingers to clutch grip the asymmetrical contoured mouse body by placing an angle of 35 degrees between the axis of a forearm and a palm, wherein the 35 degree angle allows an outer palm and inner palm to rest on the mouse back surface in a relaxed inclined position with a wrist at its lowest position and the forearm resting on a surface, hence exerting minimal flexion or strain on the hand's musculoskeletal structure; seven touch control centers are located horizontal on the width of the body in the form four finger click-buttons, wherein said four finger click-buttons are horizontally aligned and located on the bottom side of a front contoured protruding part; one scroll wheel click-button, wherein a thumb rests on said scroll wheel click-button when the palm rests on mouse body in a clutch grip posture; and two function buttons, wherein the two function buttons are located on opposite sides of the scroll wheel button, in an upper and lower position easily accessible by a thumb; and a mouse optical module is located at the bottom surface of the computer mouse device, wherein said mouse optical module is directly below the finger-click button directly adjacent to the scroll-wheel click button to minimize hand and wrist movements.

2. The computer mouse device according to claim 1, wherein the asymmetrical contoured mouse body is in a form of a nonfunctional single homogeneous part, wherein the asymmetrical contoured mouse body is made in at least one of a casting method or molding method, wherein the asymmetrical contoured mouse body is made using at least one of plastic, ceramic, metal, gel or elastomers.

3. The computer mouse device according to claim 1, wherein a plurality of functions are performed using one or more of the touch control centers by contacting the touch control center with one or multiple fingers.

4. The computer mouse device according to claim 1, wherein the touch control center buttons include an upper and lower function click buttons, and wherein these touch centers enable functions and combinations such as a five finger click, a four finger click, a three finger click, a two finger click, and a one finger click.

5. The computer mouse device of claim 4, wherein the combination of the upper function click button and the index finger click is used for either accelerated or precision motion of the pointer on screen.

6. The computer mouse device of claim 4, wherein a combination of the five finger click and left/right mouse move is used for programmable 3D object manipulation or space navigation in 3D CAD applications, or 3D interfaces including video gaming, virtual or augmented reality.

7. The computer mouse device of claim 4, wherein a gyro is integrated into the computer mouse device, and a combination of the upper function click button, the four finger clicks, and lifting the ergonomic mouse device up and moving it left/right generates an accelerated move/pan left/right of 3D objects in 3D CAD applications or other 3D interfaces including video games.

8. The computer mouse device of claim 4, wherein a combination of an upper function click button, two finger click, and a forward/backward mouse move is used for an accelerated effect of zoom in/out in 3D CAD applications, or other 3D interfaces.

\* \* \* \* \*